(12) United States Patent
Crucs

(10) Patent No.: US 8,265,254 B2
(45) Date of Patent: Sep. 11, 2012

(54) AUTO-MATCHING OF A PHONE EXTENSION TO A TRACKED INDIVIDUAL WITHIN A DOMAIN

(75) Inventor: Kevin M. Crucs, Copley, OH (US)

(73) Assignee: Crucs Holdings, LLC, Copley, OH (US)

( * ) Notice: Subject to any disclaimer, the term of this patent is extended or adjusted under 35 U.S.C. 154(b) by 366 days.

(21) Appl. No.: 12/752,742

(22) Filed: Apr. 1, 2010

(65) Prior Publication Data

US 2011/0243316 A1   Oct. 6, 2011

(51) Int. Cl.
*H04M 3/42*   (2006.01)
(52) U.S. Cl. ......... 379/207.12; 379/207.13; 379/207.14; 379/211.02; 379/201.06; 379/142.1; 379/88.19; 379/88.2; 379/88.21
(58) Field of Classification Search .......... 379/207.12–207.14, 142.1, 201.06, 379/211.02, 88.18, 88.2, 88.21
See application file for complete search history.

(56) References Cited

U.S. PATENT DOCUMENTS

| 5,455,851 | A | * | 10/1995 | Chaco et al. | 379/38 |
| 5,515,426 | A | * | 5/1996 | Yacenda et al. | 379/201.07 |
| 5,548,637 | A | * | 8/1996 | Heller et al. | 379/201.07 |
| 5,822,418 | A | * | 10/1998 | Yacenda et al. | 379/201.07 |
| 5,867,563 | A | * | 2/1999 | Kato et al. | 379/88.01 |
| 6,058,178 | A | * | 5/2000 | McKendry et al. | 379/212.01 |
| 2002/0064275 | A1 | * | 5/2002 | Tatsumi | 379/229 |
| 2006/0142012 | A1 | | 6/2006 | Kirchhoff et al. | |

FOREIGN PATENT DOCUMENTS

DE   19758352 A1   6/1999

* cited by examiner

*Primary Examiner* — Joseph J Nguyen
(74) *Attorney, Agent, or Firm* — Hahn Loeser & Parks LLP

(57) ABSTRACT

A system and methods for telephoning individuals associated with a domain. A current location of a given individual within a domain is automatically determined and the given individual is automatically associated with a telephone extension number based on the current location of the given individual. As the given individual moves around within the domain, the associated telephone extension number associated with the given individual is updated. A receptionist or other individual within the domain may select to telephone the given individual thereby automatically accessing and dialing the telephone extension number currently associated with the given individual in response to selecting to telephone the given individual. If the given individual is not currently located within the domain, an external telephone number associated with the given individual may be automatically accessed and dialed in response to selecting to telephone the given individual.

21 Claims, 9 Drawing Sheets

144

| LOCATION (cloc) | EXTENSION (cext) |
|---|---|
| office #1 | x2281 |
| office #2 | x2282 |
| front desk | x2283 |
| copy room | x2284 |
| laboratory | x2285 |
| out | external | predefined location/extension map

FIG. 5 adaptive extension/IID map

| IID | EXTENSION |
|---|---|
| Rick | x2283 |
| Jane | x2281 |
| Dave | 555-555-555 |
| John | x2283 |
| Sue | x2285 |

145

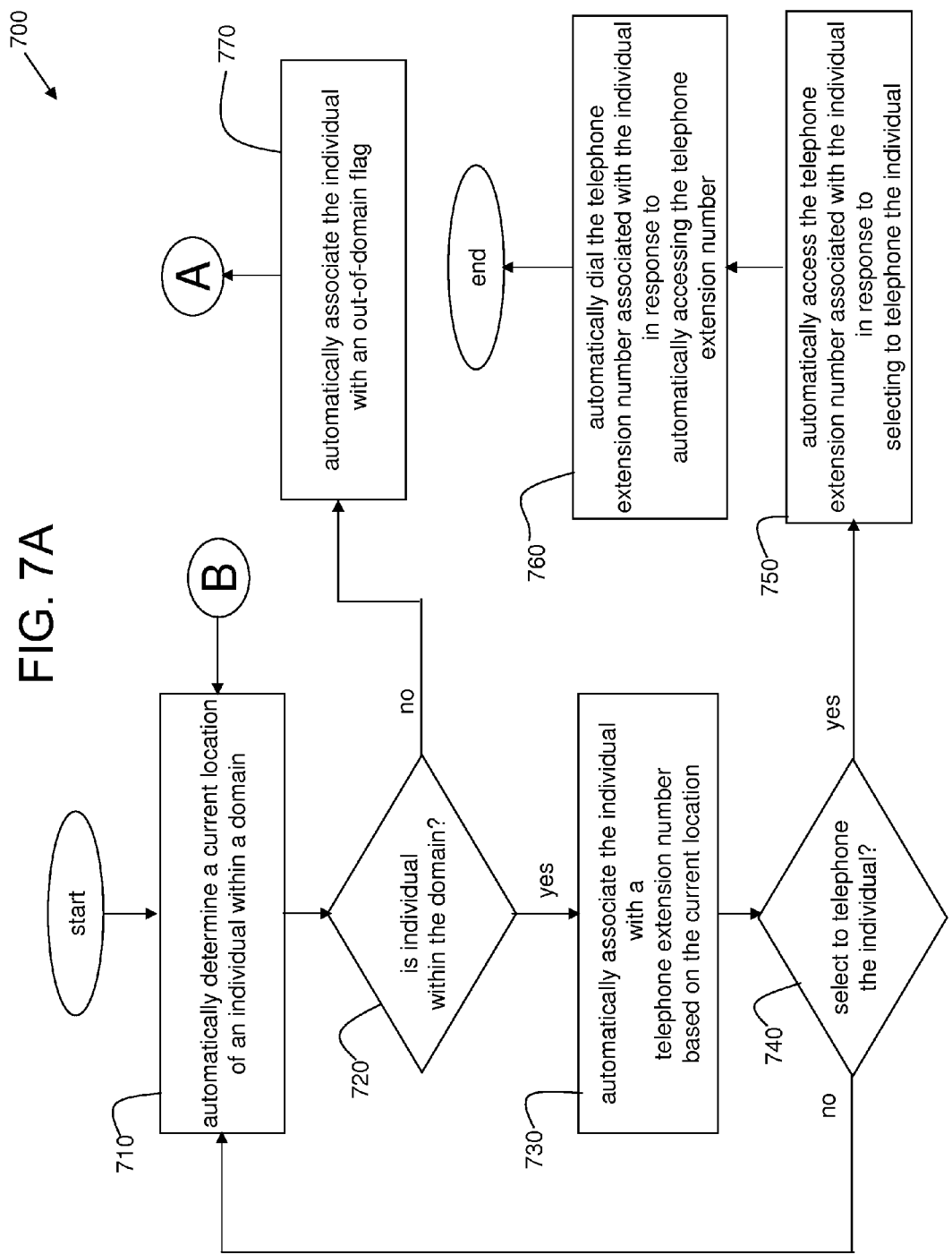

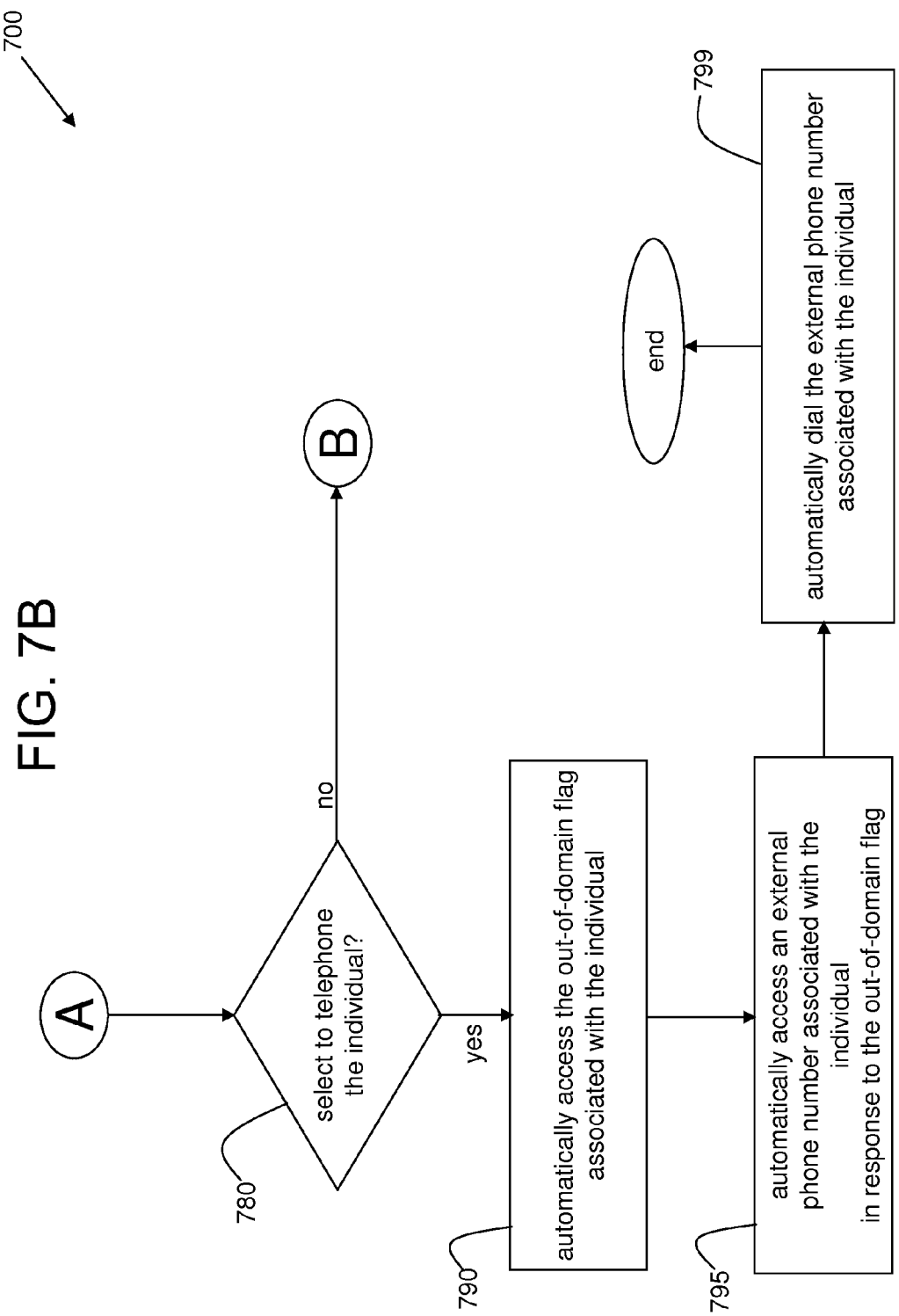

AUTO-MATCHING OF A PHONE EXTENSION TO A TRACKED INDIVIDUAL WITHIN A DOMAIN

TECHNICAL FIELD

Certain embodiments of the present invention relate to telephone systems. More particularly, certain embodiments relate to telephone systems that are set up within a domain or environment such as, for example, a professional office building or some other type of work environment.

BACKGROUND

In a typical office environment, a telephone system is installed with various handsets distributed throughout the office environment. For example, each individual office within the office environment will typically have one handset which is assigned a telephone extension number. Other handsets may be placed in other areas of the office environment such as conference rooms and presentation rooms, each having an assigned telephone extension number. The office environment may also have a receptionist station having a handset. Incoming calls may first be directed to the receptionist station and the receptionist is responsible for transferring the incoming call to the appropriate individual in the office, based on the fixed telephone extension number associated with the handset of that individual in his/her office. In general, telephone communication between any of the various occupants of the office environment is accomplished by dialing the telephone extension number of the handset associated with the desired individual to contact. However, if a particular individual is not in his/her office (where his/her handset is located) when a call comes in, the individual will miss the call. Techniques exist for allowing an individual to forward a call coming into their handset to the telephone extension number of another handset where the individual believes he/she will be temporarily located (e.g., in another individual's office working on a project with that other individual just during the morning). Furthermore, voicemail technology allows a caller to leave a message when an individual does not answer his/her phone.

Further limitations and disadvantages of conventional, traditional, and proposed approaches will become apparent to one of skill in the art, through comparison of such approaches with the subject matter of the present application as set forth in the remainder of the present application with reference to the drawings.

SUMMARY

An embodiment of the present invention comprises a system for telephoning individuals associated with a domain. The system includes means for automatically determining a current location of a first individual within a domain. The system further includes means for automatically associating the first individual with a telephone extension number based on determining the current location of the first individual. The system also includes means for selecting to telephone the first individual, and means for automatically accessing the telephone extension number associated with the first individual in response to selecting to telephone the first individual. The system may further include means for automatically dialing the telephone extension number associated with the first individual in response to automatically accessing the telephone extension number. The system may also include means for determining that a current location of a second individual is an external location being external to the domain. The system may further include means for automatically associating the second individual with an external phone number based on determining that a current location of the second individual is an external location. The system may also include means for selecting to telephone the second individual, and means for automatically accessing the external phone number associated with the second individual in response to selecting to telephone the second individual. The system may further include means for automatically dialing the external telephone number associated with the second individual in response to accessing the external phone number.

Another embodiment of the present invention comprises a method for telephoning individuals associated with a domain. The method includes automatically determining a current location of a first individual within a domain using a spatial tracking system. The method further includes automatically associating the first individual with a telephone extension number using a domain controller based on determining the current location of the first individual. The method also includes selecting to telephone the first individual using a domain telephone system, and automatically accessing the telephone extension number associated with the first individual using the domain controller in response to selecting to telephone the first individual. The method may further include automatically dialing the telephone extension number associated with the first individual using the domain telephone system in response to automatically accessing the telephone extension number. The method may also include determining that a current location of a second individual is an external location being external to the domain using the spatial tracking system. The method may further include automatically associating the second individual with an external phone number using the domain controller based on determining that a current location of the second individual is an external location. The method may also include selecting to telephone the second individual using the domain telephone system, and automatically accessing the external phone number associated with the second individual using at least one of the domain controller and the domain telephone system in response to selecting to telephone the second individual. The method may further include automatically dialing the external phone number associated with the second individual using the domain telephone system in response to accessing the external phone number.

A further embodiment of the present invention comprises a domain controller for enhancing a telephone system within a domain. The domain controller includes means for receiving a first current location of a first tracked individual within a domain and a first individual identifier of the first tracked individual from a spatial tracking system of the domain. The domain controller further includes means for associating the first individual identifier with a first telephone extension number based on the first current location. The domain controller also includes means for receiving a request to telephone the first tracked individual from a telephone system of the domain. The domain controller further includes means for accessing the first telephone extension number associated with the first tracked individual in response to receiving a request to telephone the first tracked individual, and means for sending the first telephone extension number to the telephone system. The domain controller may further include means for receiving a second current location of a second tracked individual within the domain and a second individual identifier of the second tracked individual from the spatial tracking system of the domain. The domain controller may also include means for associating the second individual identifier with a second telephone extension number based on the second current location. The domain controller may further include means for receiving a request to telephone the second tracked individual from a telephone system of the domain. The domain controller may also include means for accessing the second telephone extension number associated with the second tracked individual in response to receiving a request to telephone the second tracked individual, and means for sending the second telephone extension number to the telephone system. The domain controller may further include means for receiving a no-track indicator, indicating that a third individual is not currently being tracked within the domain, and a third individual identifier of the untracked third individual from the spatial tracking system of the domain. The domain controller may also include means for associating the third individual identifier with an out-of-domain flag based on the no-track indicator. The domain controller may further include means for receiving a request to telephone the third individual from the telephone system of the domain, and means for accessing the out-of-domain flag associated with the untracked third individual in response to receiving a request to telephone the untracked third individual. The domain controller may also include means for sending the out-of-domain flag to the telephone system in response to accessing the out-of-domain flag associated with the untracked third individual. Alternatively, the domain controller may include means for accessing an external phone number associated with the third individual in response to accessing the out-of-domain flag associated with the untracked third individual, and means for sending the external phone number to the telephone system.

Another embodiment of the present invention comprises a system for telephoning individuals associated with a domain. The system includes means for automatically determining a current location of each of a plurality of individuals within the domain. The system further includes means for automatically associating each of the plurality of individuals with a telephone extension number based on determining the current location of each of the plurality of individuals. The system also includes means for selecting to telephone any of the plurality of individuals, and means for automatically accessing the telephone extension number associated with one of the plurality of individuals in response to selecting to telephone the one of the plurality of individuals. The system may further include means for automatically dialing the telephone extension number associated with the one of the plurality of individuals in response to automatically accessing the telephone extension number. The system may also include means for determining that a current location of any of the plurality of individuals is an external location being external to the domain. The system may further include means for automatically associating the any of the plurality of individuals with an external phone number based on determining that a current location of the any of the plurality of individuals is an external location. The system may also include means for automatically accessing the external phone number associated with one of the any of the plurality of individuals in response to selecting to telephone the one of the any of the plurality of individuals. The system may further include means for automatically dialing the external phone number associated with the one of the any of the plurality of individuals in response to accessing the external phone number.

A further embodiment of the present invention comprises a method for telephoning individuals associated with a domain. The method includes automatically determining a current location of each of a plurality of individuals within the domain using a spatial tracking system. The method further includes automatically associating each of the plurality of individuals with a telephone extension number using a domain controller based on determining the current location of each of the plurality of individuals. The method also includes selecting to telephone one of the plurality of individuals using a domain telephone system, and automatically accessing the telephone extension number associated with the one of the plurality of individuals using the domain controller in response to selecting to telephone the one of the plurality of individuals. The method may further include automatically dialing the telephone extension number associated with the one of the plurality of individuals using the domain telephone system in response to automatically accessing the telephone extension number. The method may also include determining that a current location of any of the plurality of individuals is an external location being external to the domain using the spatial tracking system. The method may further include automatically associating the any of the plurality of individuals with an external phone number using the domain controller based on determining that a current location of any of the plurality of individuals is an external location. The method may also include selecting to telephone one of the any of the plurality of individuals using the domain telephone system, and automatically accessing the external phone number associated with the one of the any of the plurality of individuals using at least one of the domain controller and the domain telephone system in response to selecting to telephone the one of the any of the plurality of individuals. The method may further include automatically dialing the external phone number associated with the one of the any of the plurality of individuals using the domain telephone system in response to accessing the external phone number.

Another embodiment of the present invention comprises a system for enhancing the ability to telephone individuals associated with a domain. The system includes a spatial tracking system configured for automatically determining a current location of each of a plurality of individuals within the domain. The system further includes a domain controller operatively interfacing to the spatial tracking system and configured for automatically associating each of the plurality of individuals with a telephone extension number as the current location of each of the plurality of individuals is determined. The domain controller is also configured for automatically accessing the telephone extension number associated with one of the plurality of individuals after a user selects to telephone the one of the plurality of individuals. The system may further include a domain telephone system operatively interfacing to the domain controller and configured for allowing a user to select to telephone any of the plurality of individuals. The domain telephone system may also be configured for automatically dialing the telephone extension number associated with the one of the plurality of individuals after the telephone extension number is automatically accessed by the domain controller.

These and other novel features of the subject matter of the present application, as well as details of illustrated embodiments thereof, will be more fully understood from the following description and drawings.

BRIEF DESCRIPTION OF THE DRAWINGS

FIG. 5 illustrates an example diagram of an adaptive telephone extension number map used in the domain controller of FIG. 2-3;

FIGS. 7A-7B illustrate a flow chart of an example embodiment of a method of telephoning individuals associated with a domain using the system of FIG. 1.

DETAILED DESCRIPTION

Figure 1:
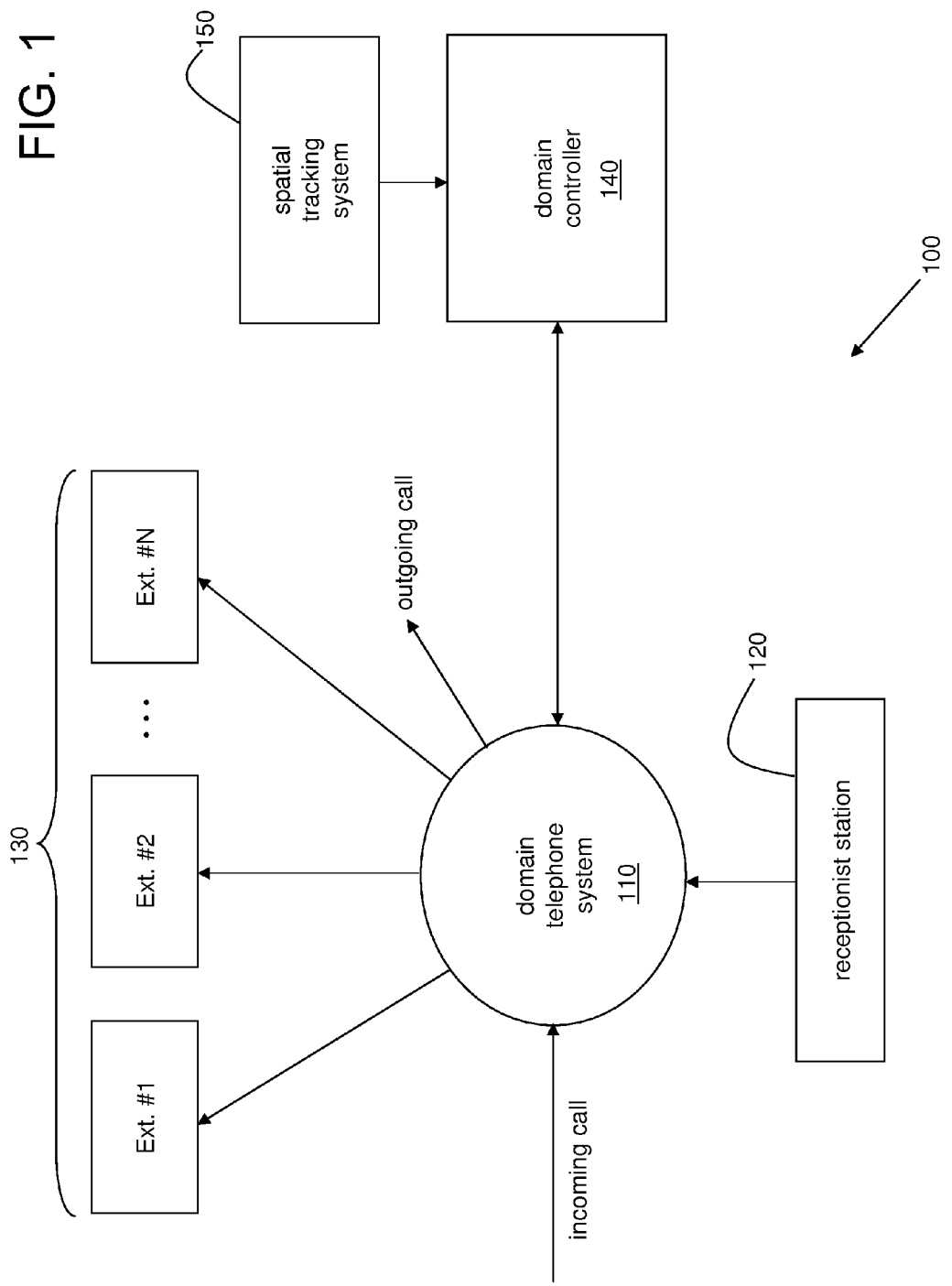
FIG. 1 illustrates a schematic block diagram of an example embodiment of a system for telephoning individuals associated with a domain.

FIG. 1 illustrates a schematic block diagram of an example embodiment of a system 100 for telephoning individuals associated with a domain. In general, the system 100 exists or is implemented within the domain, although certain aspects of the system may exist or be implemented outside of the domain in accordance with various alternative embodiments. The domain may be, for example, a set of offices and other rooms or areas on the floor of a professional office building, or some other type of work environment. Other types of domains are possible as well, in accordance with various other embodiments of the present invention including, for example, a construction site or an amusement park.

The system 100 includes a domain telephone system 110 operationally connected to a receptionist station 120 and to a plurality of telephone handsets 130. Each of the plurality of telephone handsets 130 is assigned a telephone extension number (e.g., Ext. #1=2281, Ext. #2=2282, etc.). As used herein, the term "telephone extension number" is used generally to mean any abstraction that identifies a particular telephone handset 130 within the domain. For example, a telephone extension number may be a four-digit number as indicated above, or and IP address, or a full telephone number (e.g., 7 digits or 10 digits), or a telephone system ID, or some other abstraction capable of being used to identify a particular telephone handset 130.

The domain telephone system 110 is capable of receiving incoming calls from an external caller and initiating calls to an external caller for external communication. The domain telephone system 100 is further capable of facilitating internal communication between a user of the receptionist station 120 and users of the various plurality of telephone handsets 130, and between users of the various plurality of telephone handsets 130. Some or all of the plurality of telephone handsets 130 may include a display, for example, to display the name or ID of a person being called.

The system 100 also includes a domain controller 140 operationally interfacing to the domain telephone system 110, and a spatial tracking system 150 operationally interfacing to the domain controller 140. In accordance with an embodiment of the present invention, the domain telephone system 110 communicates with the domain controller 140 to grab or access a telephone extension number currently associated with an individual being telephoned within the domain. In accordance with an embodiment of the present invention, the spatial tracking system 150 keeps track of the current location of individuals within the domain and communicates the location information to the domain controller 140 such that the domain controller 140 can associate a nearby telephone extension number with the name (or other identifier) of each tracked individual within the domain. In this manner, when a particular individual is to be called within the domain, the system 100 will "know" where in the domain that individual is located and direct the telephone call to the telephone extension number currently associated with that tracked individual (e.g., to the handset in closest proximity to the tracked individual being called).

Not every telephone handset within a domain has to be a potential "closest handset". Some handsets may not be integrated as part of the tracking mechanism. Alternatively, there may be multiple "closest handsets" within a particular area such that, for example, if one or more of the telephone handsets in that area are already in use, the system 100 can direct the call to the closest telephone handset to the individual being called that is not currently in use. If no telephone handset 130 is available in proximity to the individual being called (all telephone handsets are in use), then the system 100 can direct the call to voicemail, for example.

Communication between the various elements of the system 100 may be accomplished by networking hardware including wireless as well as hard wired (directly connected) devices. The various elements of the system 100 may be configured via a local area network (LAN) or a wide area network (WAN), for example, in accordance with certain embodiments of the present invention. In accordance with other embodiments of the present invention, the various elements of the system 100 may communicate with each other via other types of interfaces including, for example, universal serial bus (USB) interfaces. Other types of interfaces are possible as well, in accordance with sound engineering judgment.

Figure 2:
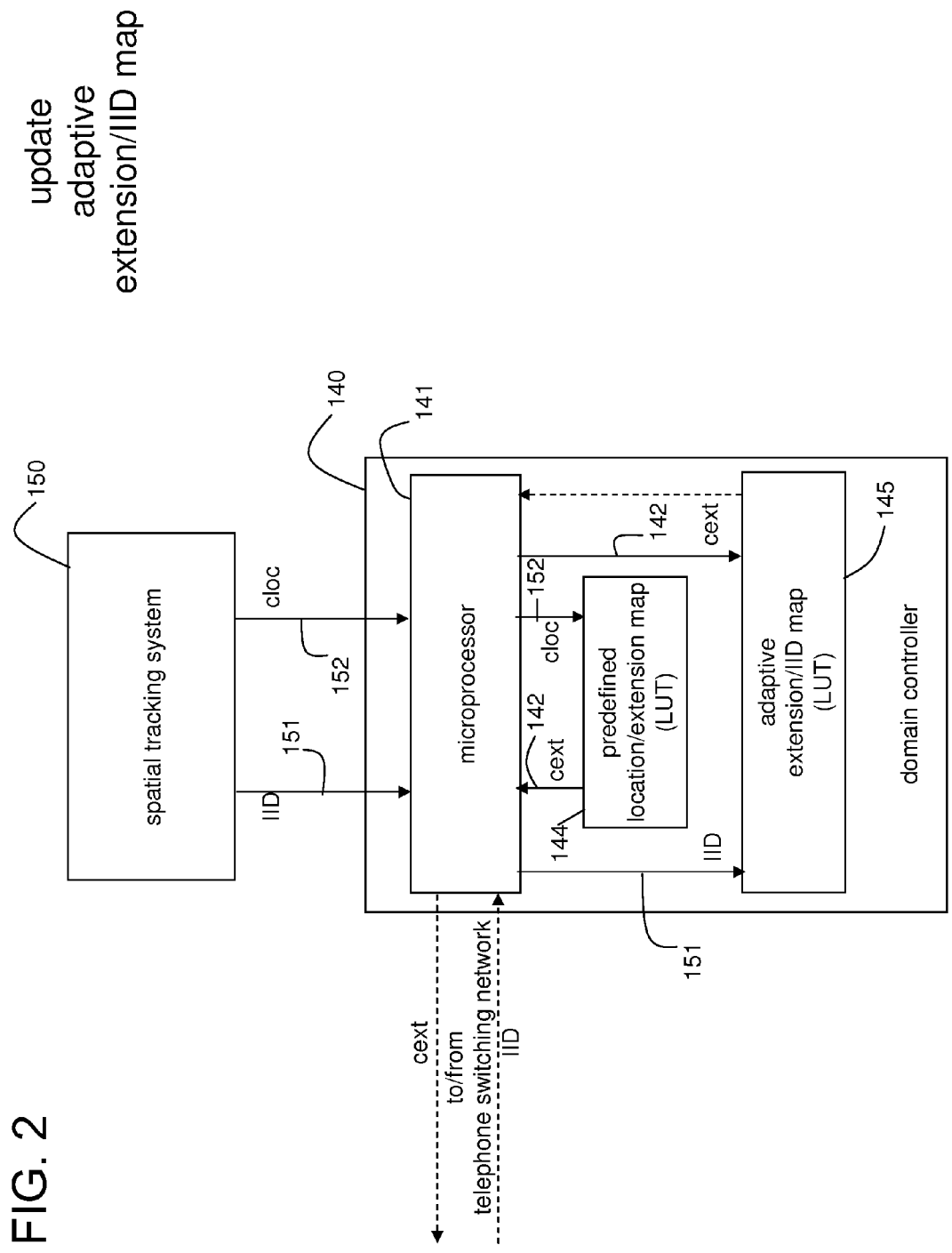
FIG. 2 illustrates a schematic block diagram of an example embodiment of a domain controller operatively interfacing to a spatial tracking system and used in the system of FIG. 1 and illustrating the process of updating an adaptive telephone extension number map.

FIG. 2 illustrates a schematic block diagram of an example embodiment of a domain controller 140 operatively interfacing to a spatial tracking system 150 and used in the system 100 of FIG. 1 and illustrating the process of updating an adaptive telephone extension number map 145. The solid arrowed lines in FIG. 2 indicate the active communication that takes place when updating the map 145.

Figure 8:
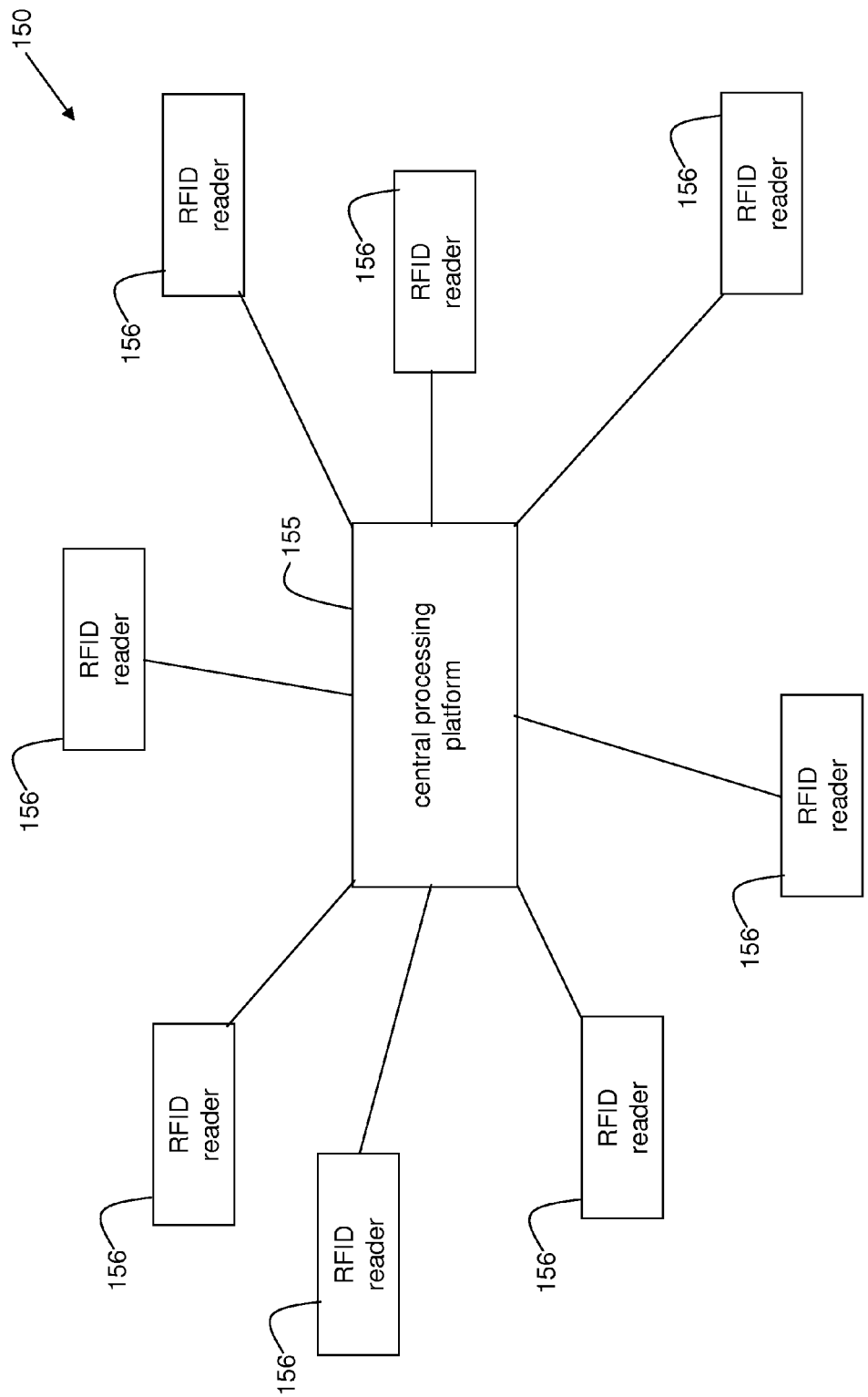
FIG. 8 illustrates an example embodiment of the spatial tracking system of FIGS. 1-3.

The spatial tracking system 150 may include any of various types of spatial tracking systems, in accordance with various embodiments of the present invention. For example, the spatial tracking system 150 may use radio frequency identification (RFID) technology, magnetic card reader technology, global positioning system (GPS) technology, biometric technology such as, for example, face recognition technology, or some other type of tracking technology capable of being used to track individuals within a domain. FIG. 8 illustrates an example embodiment of the spatial tracking system 150 of FIGS. 1-3. The spatial tracking system 150 of FIG. 8 includes a plurality of RFID readers (scanners) 156 each operatively interfacing to a central processing platform 155. The RFID readers 156 may communicate with the central processing platform 155 either wirelessly or via wired means. As each RFID reader 156 reads an RFID tag or chip of a nearby individual, the identification of the individual and the current location of the individual is reported to the central processing platform 155. The central processing platform 155 operatively interfaces with the domain controller 140.

In accordance with an embodiment of the present invention, the central processing platform 155 includes programmable hardware and software components. The programmable hardware may include one or more logic processors capable of being programmed, an example of which may include one or more microprocessors. However, other types of programmable circuitry may be used without departing from the intended scope of coverage of the embodiments of the present invention. The central processing platform 155 may further include support circuitry including electronic memory, along with other peripheral support circuitry that facilitate operation of the one or more logic processors. The central processing platform 155 may further include data storage, examples of which include hard disk drives, optical storage devices and/or flash memory for the storage and retrieval of data. Still any type of support circuitry may be used with the one or more logic processors as chosen with sound engineering judgment. Accordingly, the central processing platform 155 may be programmable and operable to execute coded instructions in a high or a low level programming language. It should be noted that any form of programming or type of programming language may be used to code algorithms or instructions as executed by the spatial tracking system 150.

For example, in an embodiment where the spatial tracking system 150 uses RFID technology, an RFID reader (scanner) 156 may be positioned within each office, room, or area of the domain associated with a telephone handset 130 having a telephone extension number within the domain. Each individual person associated with the domain (e.g., each employee that works within the domain) has an identifying RFID tag or chip which is carried on their person, for example, in the form of a badge or other clip-on device. As an individual, having an RFID tag, moves around within the domain and comes in proximity to an RFID reader 156, the RFID reader 156 reads the RFID tag of the individual, thus identifying the individual as being in proximity of the RFID reader 156. The RFID reader 156 then sends (e.g., transmits) the identifying information as an individual identifier (IID) 151 to the domain controller 140, along with the current location information (cloc) 152 associated with the RFID reader 156 (i.e., the location of the RFID reader within the domain, or an identifier of the RFID reader which may be correlated to a particular location within the domain).

Once the domain controller 140 receives the IID 151 and the current location (cloc) 152 of the tracked individual, an adaptive extension/IID map 145 within the domain controller may be updated to reflect the current location of the tracked individual. In accordance with an embodiment of the present invention, the domain controller 140 includes programmable hardware and software components. The programmable hardware may include one or more logic processors capable of being programmed, an example of which may include one or more microprocessors. However, other types of programmable circuitry may be used without departing from the intended scope of coverage of the embodiments of the present invention. The domain controller may further include support circuitry including electronic memory, along with other peripheral support circuitry that facilitate operation of the one or more logic processors. The domain controller 140 may further include data storage, examples of which include hard disk drives, optical storage devices and/or flash memory for the storage and retrieval of data. Still any type of support circuitry may be used with the one or more logic processors as chosen with sound engineering judgment. Accordingly, the domain controller may be programmable and operable to execute coded instructions in a high or a low level programming language. It should be noted that any form of programming or type of programming language may be used to code algorithms or instructions as executed by the domain controller 140.

Referring to FIG. 2, in accordance with an embodiment of the present invention, the domain controller 140 includes at least one microprocessor 141 and electronic memory storing an adaptive extension/IID map 145 and a predefined location/extension map 144. The maps 144 and 145 serve as look-up tables (LUTs) for ultimately correlating a tracked individual to a telephone extension number. When the IID 151 and the cloc 152 for a particular tracked individual is received by the domain controller 140, the microprocessor 141 processes and passes the cloc 152 to the predefined location/extension map 144. An example of an embodiment of a predefined location/extension map 144 is shown in FIG. 4, where FIG. 4 illustrates an example diagram of an embodiment of a predefined location/extension map 144 used in the domain controller of FIGS. 2-3. In FIG. 4, the cloc or location corresponds to actual locations within the domain (e.g., office #1, office #2, front desk, copy room, laboratory). However, the map 144 also includes an "out" location for indicating when an individual is not found (i.e., is not currently being tracked) within the domain and, therefore, is assumed to be outside of the domain.

The cloc 152 serves as an address into the map (LUT) 144. When the map 144 is addressed by the microprocessor 141 using the cloc 152, the map 144 returns a telephone extension number to the microprocessor 141. For example, if the cloc provided by the microprocessor is "office #2", then the map 144 returns the telephone extension number "x2282" to the microprocessor 141 since the map 144 maps that location (i.e., office #2) to that telephone extension number (i.e., x2282) in the LUT. Similarly, if the cloc provided by the microprocessor is "laboratory", then the map 144 returns the telephone extension number "x2285" to the microprocessor 141 since the map 144 maps that location (i.e., laboratory) to that telephone extension number (i.e., x2285) in the LUT.

The microprocessor 141 then receives the current telephone extension number (cext) 142 currently associated with the cloc in the LUT 144 and provides the cext 142 to the adaptive extension/IID map 145 along with the IID 151 originally provided by the spatial tracking system 150. The IID serves as an address into the map 145. FIG. 5 illustrates an example diagram of an adaptive telephone extension number map 145 used in the domain controller of FIGS. 2-3. In FIG. 5, the IID 151 corresponds to an actual first name of an individual associated with the domain (e.g., Rick, Jane, Dave, John, Sue). Each IID 151 is mapped to a current telephone extension number in the map (LUT) 145.

When the microprocessor 141 addresses the map 145 via the IID 151, the telephone extension number in the map 145 that is associated with the IID 151 is updated to correspond to the current telephone extension number (cext) 142. For example, if the spatial tracking system 150 currently has individual "Sue" (IID for Sue) as being in the laboratory (cloc), then the current telephone extension number for "Sue" in the map 145 is updated to be "x2285" since, in map 144 the laboratory is mapped to "x2285". In this manner, each individual within the domain may be continuously tracked and their associated telephone extension number continuously updated as each individual moves around within the domain. The map 144 which maps location to extension is predefined and, once set up, usually does not have to be updated. However, the map 145 which maps IID to extension is constantly updated as individuals move around within the domain.

Figure 3:
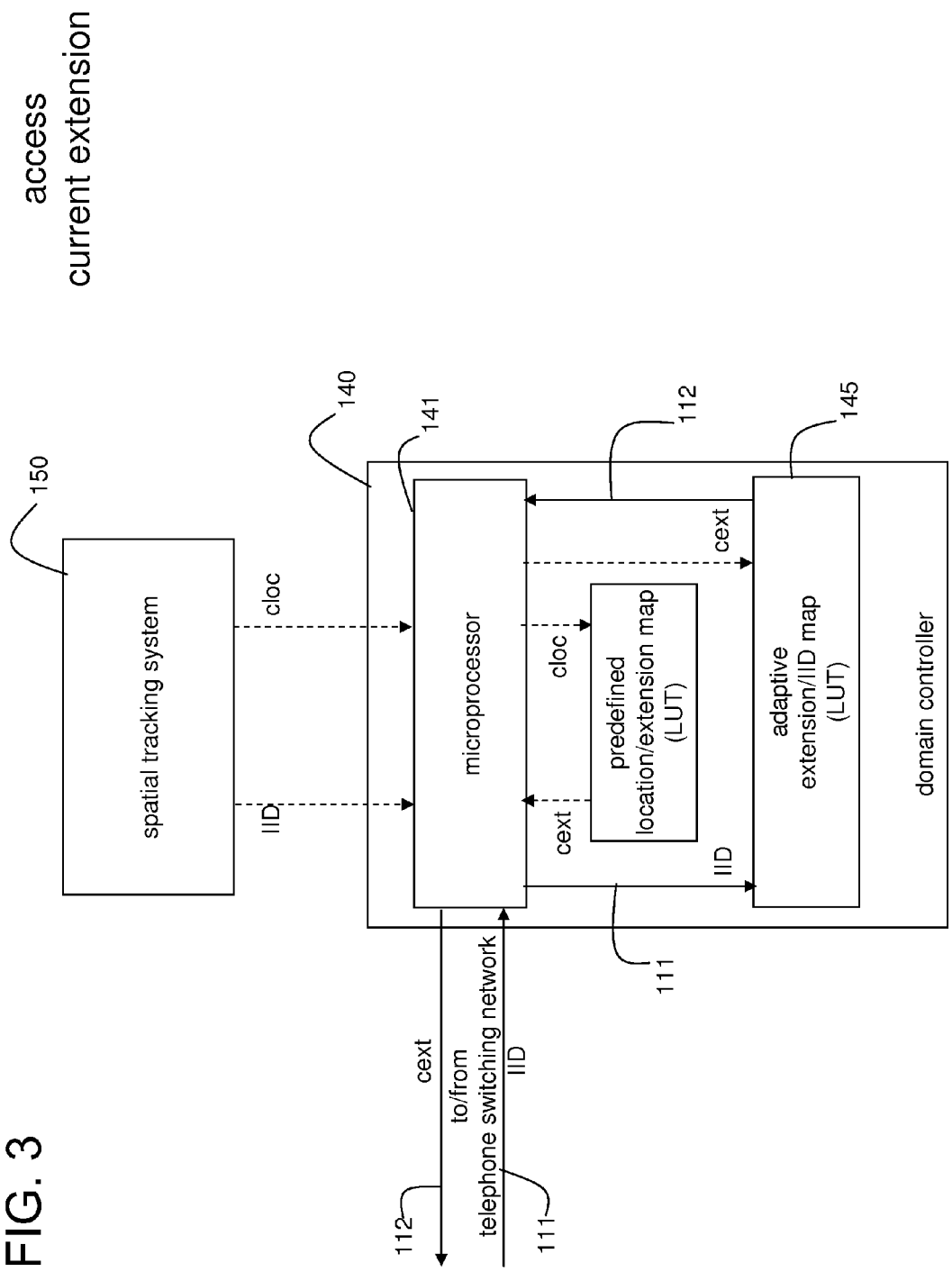
FIG. 3 illustrates a schematic block diagram of the example embodiment of the domain controller of FIG. 2 operatively interfacing to the spatial tracking system of FIG. 2 and illustrating the process of accessing a telephone extension number currently associated with an individual associated with the domain of FIG. 1.
Figure 4:
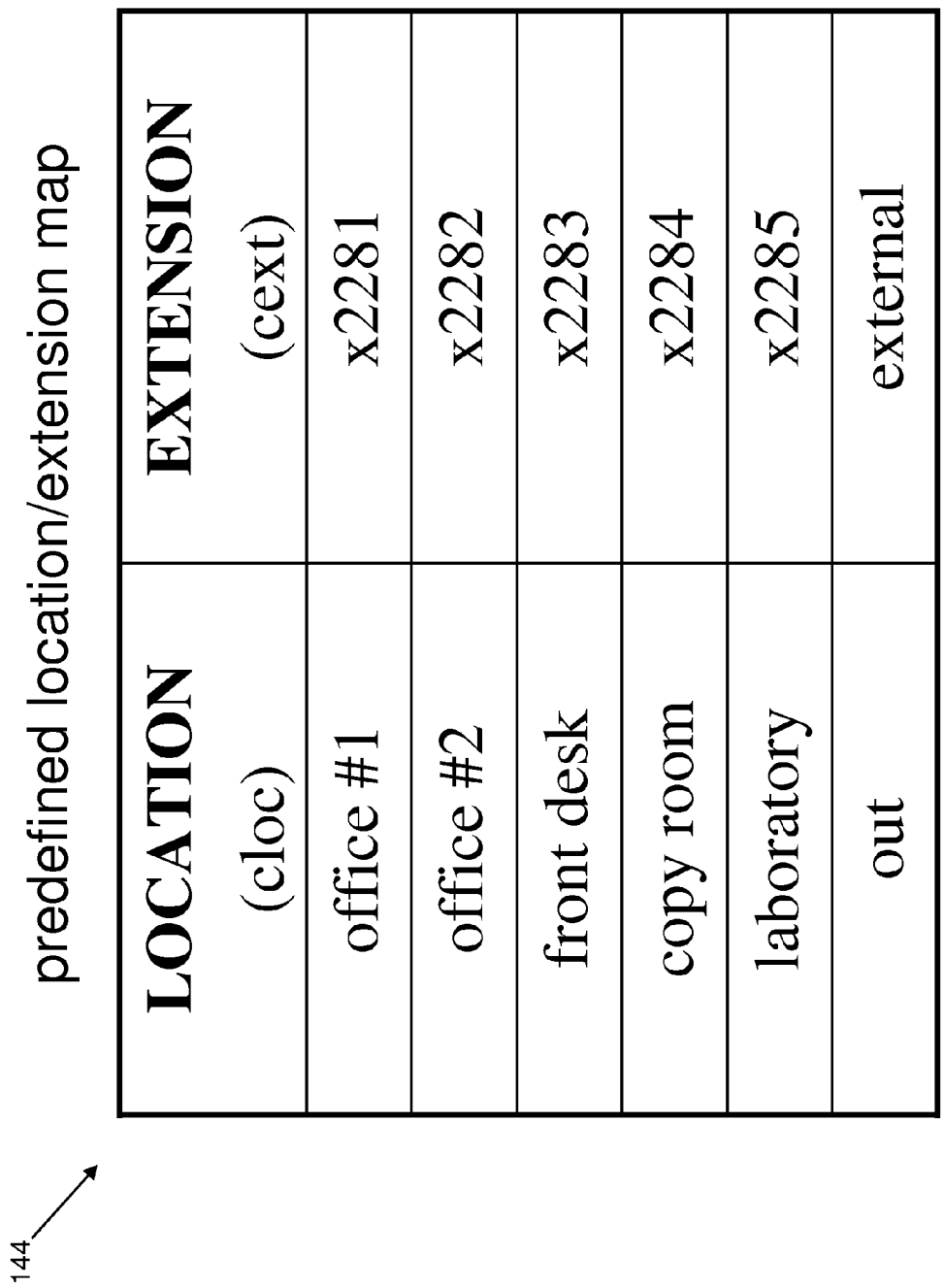
FIG. 4 illustrates an example diagram of an embodiment of a predefined location/extension map used in the domain controller of FIGS. 2-3.

FIG. 3 illustrates a schematic block diagram of the example embodiment of the domain controller 140 of FIG. 2 operatively interfacing to the spatial tracking system 150 of FIG. 2 and illustrating the process of accessing a telephone extension number currently associated with an individual associated with the domain of the system 100 of FIG. 1. The solid arrowed lines in FIG. 3 indicate the active communication that takes place when accessing a current telephone extension number.

Figure 6:
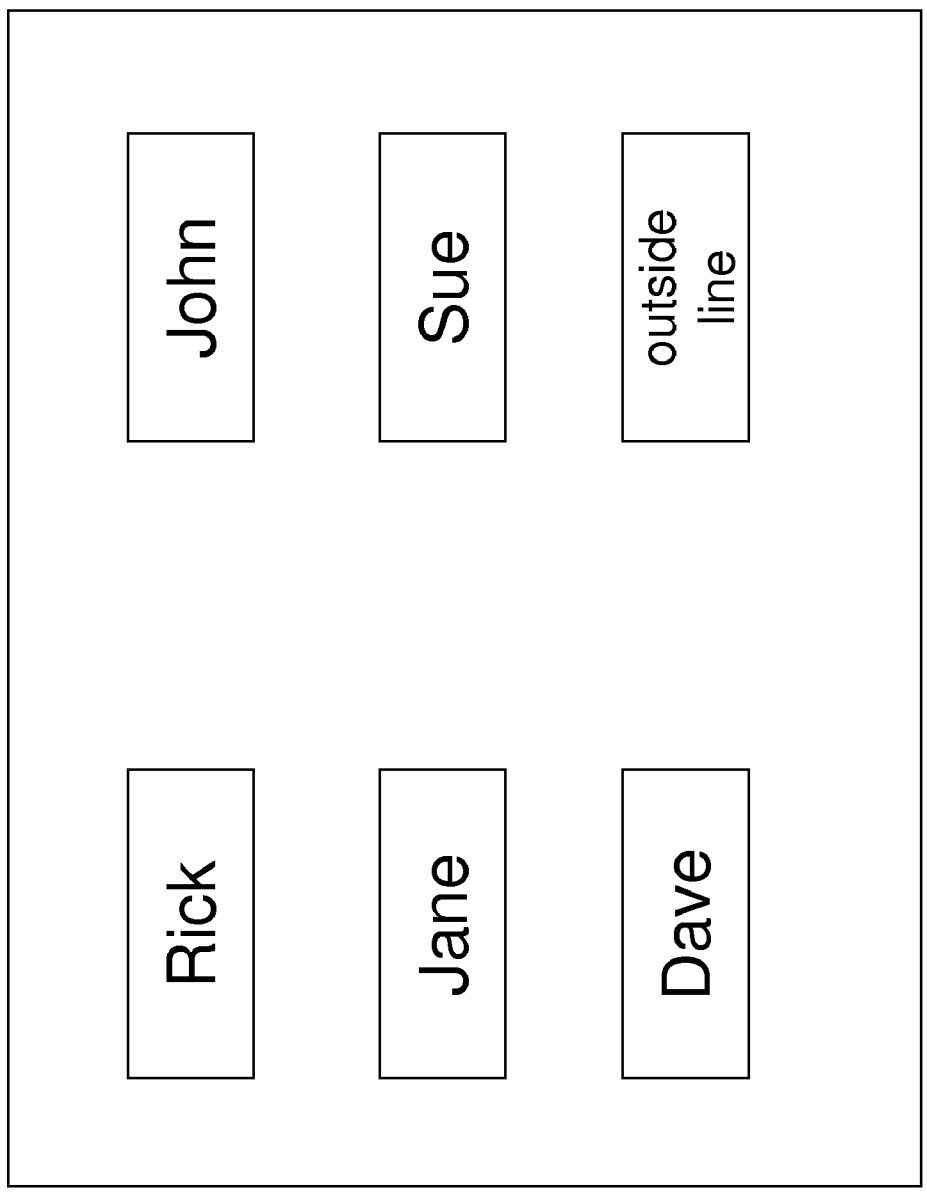
FIG. 6 illustrates an example embodiment of a receptionist panel associated with a receptionist station of the system of FIG. 1.

When a call is being placed to an individual within the domain, an IID 111 is received by the domain controller 140 from the domain telephone system 110. The microprocessor 141 processes and passes the IID 111 to the adaptive extension/IID map 145 to address the map 145. The map 145 then returns the current telephone extension number (cext) 112 currently associated with the IID 111 to the microprocessor 141. The microprocessor 141 then sends the cext 112 to the domain telephone system 110. For example, referring to FIG. 5, when someone attempts to call (i.e., to telephone) "Rick" within the domain, for example by selecting "Rick" on the front of a telephone handset 130 or receptionist panel 600 (e.g., see FIG. 6 where FIG. 6 illustrates an example embodiment of a receptionist panel 600 associated with a receptionist station 120 of the system of FIG. 1), the IID 111 for "Rick" is sent from the domain telephone system 110 to the domain controller 140. As a result, referring to FIG. 5, the telephone extension number "x2283" that is currently associated with "Rick" in the map 145 is accessed and sent back to the telephone domain controller 110.

Just as a point of interest, according to the map 144 (see FIG. 4) of the domain controller 140, the telephone extension number "x2283" corresponds to the "front desk" location, indicating that the individual, Rick, is currently located near the front desk of the domain, for example, near the receptionist station 120. However, with the system 100, the person calling Rick does not have to know where Rick is located within the domain, and then figure out what extension to call in order to reach Rick. Instead, the system 100 already knows Rick's location within the domain and automatically dials the appropriate extension to reach Rick. No matter where Rick moves to within the domain, a person within the domain trying to call Rick simply has to select "Rick" on their handset. In accordance with an embodiment of the present invention, Rick's name may be displayed on a display of the telephone handset to which the call for Rick is directed, such that, if multiple persons are near that particular telephone handset, it will be known by viewing the display that the call is directed to Rick.

Now consider the case where a particular individual is not currently present within the domain and, therefore, the spatial tracking system 150 is not able to track that particular individual. In such a case, the spatial tracking system 150 assumes that the particular individual is not present within the domain and the location cloc 152 returned by the spatial tracking system 150 is the no-track indicator "out" (indicating that the particular person is currently outside of the domain). When the cloc 152 of "out" is used to address the map 144, the map 144 returns the out-of-domain flag "external" as the extension cext 142. When the cext 142 of "external" is used to address the map 145, the map 145 is either updated with the out-of-domain flag "external" for the particular individual, or with an actual external telephone number (e.g., a cell phone number) for that particular individual. When someone attempts to call the particular individual who is not currently within the domain, the domain controller 140 returns the cext 112 of "external" (or an actual external telephone number) for that particular individual (IID 111) to the domain telephone system 110.

In accordance with the embodiment of the present invention where an actual external telephone number is returned by the domain controller 140, the domain controller 140 may include an additional map that maps IIDs to actual external telephone numbers. This additional external telephone number map is accessed within the domain controller 140 as part of the process of updating the map 145 with the actual external telephone number (e.g. cell phone number) when the particular individual is determined to be outside of the domain. In accordance with another embodiment of the present invention where the cext 112 of "external" is returned by the domain controller 140, the domain telephone system 110 may include a map that maps IIDs to actual external telephone numbers. This external telephone number map is accessed within the domain telephone system 110 in response to the cext 112 of "external" using the IID for the particular individual as the address.

In general, once an internal telephone extension number or an external telephone number is accessed, the domain telephone system 110 automatically dials the telephone number in an attempt to contact the individual. However, in accordance with other embodiments of the present invention, the system 100 may display to a caller, on a handset 130 of a caller, the current location of the particular individual being called, giving the caller a choice as to proceed with the call or not. For example, if the caller sees that the particular individual being called is currently in the laboratory, the caller may decide that they do not want to disturb the particular individual while he/she is in the laboratory and, therefore, cancels the call. However, for example, if the caller decides that the situation is urgent and wants to proceed with calling the individual, the caller may select to have the call proceed even though the individual being called is in the laboratory. Similarly, if the caller sees that the particular individual being called is currently outside of the domain, the caller may decide to wait until the individual is back within the domain and, therefore, cancel the call.

FIGS. 7A-7B illustrate a flow chart of an example embodiment of a method 700 of telephoning individuals associated with a domain using the system 100 of FIG. 1. In step 710, automatically determine a current location of an individual within a domain. This is done using the spatial tracking system 150. In step 720, a decision is made as to whether or not the individual is currently within the domain. This may be accomplished by the domain controller 140 based on the information received from the spatial tracking system 150 as described above herein. If it is determined in step 720 that the individual is within the domain then, in step 730, automatically associate the individual with a telephone extension number based on the current location. This may be accomplished by the domain controller 140 using the maps 144 and 145 as described above herein.

In step 740, a decision is made as to select to telephone the individual or not. For example, a user of a handset 130 may decide to telephone (i.e., call) the individual using the domain telephone system 110. If a selection is not made to call the individual, then go back to step 710. If a selection is made to call the individual then, in step 750, automatically access the telephone extension number associated with the individual in response to selecting to telephone the individual. The selection may be accomplished via the domain controller 140, as described above herein, in response to receiving an IID 111 from the domain telephone system 110. In step 760, automatically dial the telephone extension number associated with the individual in response to automatically accessing the telephone extension number. The automatic dialing may be accomplished by the domain telephone system 110 upon receiving the telephone extension number from the domain controller 140, as described above herein. Again, as an alternative, a user (caller) may be given the option to proceed with the call or cancel the call by displaying the current location of the individual being called on a display of the user's handset, for example. In such an embodiment, the domain controller 140 provides the current location cloc 152 to the domain telephone system 110 in addition to the current extension cext 112.

However, if it is determined in step 720 that the individual is not within the domain then, in step 770, automatically associate the individual with an out-of-domain flag. This may be accomplished by the domain controller 140 as described above herein. In step 780, a decision is made as to select to telephone the individual or not. For example, a user of a handset 130 may decide to telephone (i.e., call) the individual using the domain telephone system 110. If a selection is not made to call the individual, then go back to step 710. If a selection is made to call the individual then, in step 790, automatically access the out-of-domain flag associated with the individual in response to selecting to telephone the individual. This may be accomplished via the domain controller 140, as described above herein, in response to receiving an IID 111 from the domain telephone system 110. In step 795, automatically access an external phone number associated with the individual in response to the out-of-domain flag. The external telephone number may be stored in the domain controller 140 or in the domain telephone system 110 as described above herein. In step 799, automatically dial the external phone number associated with the individual. This may be accomplished by the domain telephone system 110 accessing an outside line to make the call. Again, as an alternative, the option to cancel the call may be provided to the user (caller).

In accordance with another embodiment of the present invention, when a call is directed to a particular telephone handset 130 located nearest the person being called, the person being called may answer the telephone handset 130, place the caller "on hold", and then proceed to walk to another area. The system 100 is capable of tracking the person being called to that other area and automatically forwarding the "on hold" call to another telephone handset 130 now nearest the person being called in the other area. For example, if the person being called is in the laboratory when a call comes in based on the person's current location of being in the laboratory, the person being called can decide to take the call in another area (e.g., if the laboratory is too noisy to hold a prolonged telephone conversation). The person being called simply puts the caller on hold and proceeds to the other area where the call will be automatically forwarded based on the person being tracked to the other area. When the person being called reaches the other area, he/she simply uses the handset 130 in that area to which the call has been forwarded to retrieve the call.

In summary, a system and methods for telephoning individuals associated with a domain is disclosed. A current location of a given individual within a domain is automatically determined and the given individual is automatically associated with a telephone extension number based on the current location of the given individual. As the given individual moves around within the domain, the associated telephone extension number associated with the given individual is updated. A receptionist or other individuals within the domain may select to telephone the given individual thereby automatically accessing and dialing the telephone extension number currently associated with the given individual in response to selecting to telephone the given individual. If the given individual is not currently located within the domain, an external telephone number associated with the given individual may be automatically accessed and dialed in response to selecting to telephone the given individual.

While the claimed subject matter of the present application has been described with reference to certain embodiments, it will be understood by those skilled in the art that various changes may be made and equivalents may be substituted without departing from the scope of the claimed subject matter. In addition, many modifications may be made to adapt a particular situation or material to the teachings of the claimed subject matter without departing from its scope. Therefore, it is intended that the claimed subject matter not be limited to the particular embodiment disclosed, but that the claimed subject matter will include all embodiments falling within the scope of the appended claims.

What is claimed is:

1. A system for telephoning individuals associated with a domain, said system comprising:
   means for automatically determining a current location of a first individual within a domain;
   means for automatically associating said first individual with a telephone extension number based on determining said current location of said first individual;
   means for selecting to telephone said first individual;
   means for automatically accessing said telephone extension number associated with said first individual in response to selecting to telephone said first individual;
   means for automatically determining a second current location of a second individual within said domain;
   means for automatically associating said second individual with a second telephone extension number based on determining said second current location of said second individual;
   means for selecting to telephone said second individual;
   means for automatically accessing said second telephone extension number associated with said second individual in response to selecting to telephone said second individual;
   means for automatically determining that a third individual is not currently being tracked within said domain;
   means for automatically associating said third individual with an out-of-domain flag based on determining that said third individual is not currently being tracked;
   means for selecting to telephone said third individual; and
   means for automatically accessing a first external telephone number associated with said third individual in response to selecting to telephone said third individual.

2. The system of claim 1 further comprising means for automatically dialing said telephone extension number associated with said first individual in response to automatically accessing said telephone extension number.

3. The system of claim 1 further comprising:
   means for determining that a current location of said second individual is an external location being external to said domain;
   means for automatically associating said second individual with a second external telephone number based on determining that a current location of said second individual is an external location;
   means for selecting to telephone said second individual; and means for automatically accessing said second external telephone number associated with said second individual in response to selecting to telephone said second individual.

4. The system of claim 3 further comprising means for automatically dialing said second external telephone number associated with said second individual in response to accessing said second external telephone number.

5. A method for telephoning individuals associated with a domain, said method comprising:
   automatically determining a current location of a first individual within a domain using a spatial tracking system;
   automatically associating said first individual with a telephone extension number using a domain controller based on determining said current location of said first individual;
   selecting to telephone said first individual using a domain telephone system;
   automatically accessing said telephone extension number associated with said first individual using said domain controller in response to selecting to telephone said first individual;
   automatically determining a second current location of a second individual within said domain using said spatial tracking system;
   automatically associating said second individual with a second telephone extension number using said domain controller based on determining said second current location of said second individual;
   selecting to telephone said second individual using said domain telephone system;
   automatically accessing said second telephone extension number associated with said second individual using said domain controller in response to selecting to telephone said second individual;
   automatically determining that a third individual is not currently being tracked within said domain;
   automatically associating said third individual with an out-of-domain flag based on determining that said third individual is not currently being tracked;
   selecting to telephone said third individual using said domain telephone system; and
   automatically accessing a first external telephone number associated with said third individual using said domain controller in response to selecting to telephone said third individual and based on said out-of-domain flag.

6. The method of claim 5 further comprising automatically dialing said telephone extension number associated with said first individual using said domain telephone system in response to automatically accessing said telephone extension number.

7. The method of claim 5 further comprising:
   determining that a current location of said second individual is an external location being external to said domain using said spatial tracking system;
   automatically associating said second individual with a second external phone number using said domain controller based on determining that a current location of said second individual is an external location;
   selecting to telephone said second individual using said domain telephone system; and
   automatically accessing said second external phone number associated with said second individual using at least one of said domain controller and said domain telephone system in response to selecting to telephone said second individual.

8. The method of claim 7 further comprising automatically dialing said second external phone number associated with said second individual using said domain telephone system in response to accessing said second external phone number.

9. A domain controller for enhancing a telephone system within a domain, said domain controller comprising:
   means for receiving a first current location of a first tracked individual within a domain and a first individual identifier of said first tracked individual from a spatial tracking system of said domain;
   means for associating said first individual identifier with a first telephone extension number based on said first current location;
   means for receiving a request to telephone said first tracked individual from a telephone system of said domain;
   means for accessing said first telephone extension number associated with said first tracked individual in response to receiving a request to telephone said first tracked individual;
   means for sending said first telephone extension number to said telephone system;
   means for receiving a second current location of a second tracked individual within said domain and a second individual identifier of said second tracked individual from said spatial tracking system of said domain;
   means for associating said second individual identifier with a second telephone extension number based on said second current location;
   means for receiving a request to telephone said second tracked individual from a telephone system of said domain;
   means for accessing said second telephone extension number associated with said second tracked individual in response to receiving a request to telephone said second tracked individual;
   means for sending said second telephone extension number to said telephone system;
   means for receiving a no-track data indicator, indicating that a third individual is not currently being tracked within said domain, and a third individual identifier of said untracked third individual from said spatial tracking system of said domain;
   means for associating said third individual identifier with an out-of-domain flag based on said no-track data indicator;
   means for receiving a request to telephone said third individual from said telephone system of said domain; and
   means for accessing said out-of-domain flag associated with said untracked third individual in response to receiving a request to telephone said untracked third individual.

10. The domain controller of claim 9 further comprising means for sending said out-of-domain flag to said telephone system in response to accessing said out-of-domain flag associated with said untracked third individual.

11. The domain controller of claim 9 further comprising:
   means for accessing an external phone number associated with said third individual in response to accessing said out-of-domain flag associated with said untracked third individual; and
   means for sending said external phone number to said telephone system.

12. A system for telephoning individuals associated with a domain, said system comprising:
   means for automatically determining a current location of each of a plurality of individuals within a domain;

means for automatically associating each of said plurality of individuals with a telephone extension number based on determining said current location of each of said plurality of individuals;
means for selecting to telephone a first one of said plurality of individuals;
means for automatically accessing said telephone extension number associated with said first one of said plurality of individuals in response to selecting to telephone said first one of said plurality of individuals;
means for selecting to telephone a second one of said plurality of individuals;
means for automatically accessing said telephone extension number associated with said second one of said plurality of individuals in response to selecting to telephone said second one of said plurality of individuals;
means for automatically determining that a third individual is not currently being tracked within said domain;
means for associating said third individual with an out-of-domain flag based on determining that said third individual is not currently being tracked;
means for selecting to telephone said untracked third individual; and
means for accessing said out-of-domain flag associated with said untracked third individual in response to selecting to telephone said untracked third individual.

13. The system of claim 12 further comprising means for automatically dialing said telephone extension number associated with said first one of said plurality of individuals in response to automatically accessing said telephone extension number.

14. The system of claim 12 further comprising:
means for determining that a current location of any of said plurality of individuals is an external location being external to said domain;
means for automatically associating said any of said plurality of individuals with an external phone number based on determining that a current location of said any of said plurality of individuals is an external location; and
means for automatically accessing said external phone number associated with one of said any of said plurality of individuals in response to selecting to telephone said one of said any of said plurality of individuals.

15. The system of claim 14 further comprising means for automatically dialing said external phone number associated with said one of said any of said plurality of individuals in response to accessing said external phone number.

16. A method for telephoning individuals associated with a domain, said method comprising:
automatically determining a current location of each of a plurality of individuals within a domain using a spatial tracking system;
automatically associating each of said plurality of individuals with a telephone extension number using a domain controller based on determining said current location of each of said plurality of individuals;
selecting to telephone a first one of said plurality of individuals using a domain telephone system;
automatically accessing said telephone extension number associated with said first one of said plurality of individuals using said domain controller in response to selecting to telephone said first one of said plurality of individuals;
selecting to telephone a second one of said plurality of individuals;
automatically accessing said telephone extension number associated with said second one of said plurality of individuals in response to selecting to telephone said second one of said plurality of individuals;
automatically determining that a third individual is not currently being tracked within said domain;
associating said third individual with an out-of-domain flag based on determining that said third individual is not currently being tracked;
selecting to telephone said untracked third individual; and
accessing said out-of-domain flag associated with said untracked third individual in response to selecting to telephone said untracked third individual.

17. The method of claim 16 further comprising automatically dialing said telephone extension number associated with said first one of said plurality of individuals using said domain telephone system in response to automatically accessing said telephone extension number.

18. The method of claim 16 further comprising:
determining that a current location of any of said plurality of individuals is an external location being external to said domain using said spatial tracking system;
automatically associating said any of said plurality of individuals with an external phone number using said domain controller based on determining that a current location of any of said plurality of individuals is an external location;
selecting to telephone one of said any of said plurality of individuals using said domain telephone system; and
automatically accessing said external phone number associated with said one of said any of said plurality of individuals using at least one of said domain controller and said domain telephone system in response to selecting to telephone said one of said any of said plurality of individuals.

19. The method of claim 18 further comprising automatically dialing said external phone number associated with said one of said any of said plurality of individuals using said domain telephone system in response to accessing said external phone number.

20. A system for enhancing the ability to telephone individuals associated with a domain, said system comprising:
a spatial tracking system configured for automatically determining a current location of each of a plurality of individuals within a domain;
a domain controller operatively interfacing to said spatial tracking system and configured for automatically associating each of said plurality of individuals with a telephone extension number as said current location of each of said plurality of individuals is determined, and further configured for automatically accessing said telephone extension number associated with one of said plurality of individuals after a user selects to telephone said one of said plurality of individuals,
wherein said domain controller is further configured to:
receive a second current location of a second tracked individual within said domain and a second individual identifier of said second tracked individual from said spatial tracking system,
associate said second individual identifier with a second telephone extension number based on said second current location,
receive a request to telephone said second tracked individual from a telephone system of said domain, access said second telephone extension number associated with said second tracked individual in response to receiving a request to telephone said second tracked individual, send said second telephone extension number to said telephone system, receive a no-track data indicator, indicating that a third individual is not currently being tracked within said domain, and a third individual identifier of said untracked third individual from said spatial tracking system, associate said third individual identifier with an out-of-domain flag based on said no-track data indicator, receive a request to telephone said third individual from said telephone system of said domain, and access said out-of-domain flag associated with said untracked third individual in response to receiving a request to telephone said untracked third individual.

21. The system of claim 20 further comprising a domain telephone system operatively interfacing to said domain controller and configured for allowing a user to select to telephone any of said plurality of individuals, and further configured for automatically dialing said telephone extension number associated with said one of said plurality of individuals after said telephone extension number is automatically accessed by said domain controller.

* * * * *